March 5, 1957  B. D. SMITH  2,783,945
NUMERAL WHEEL INDICATION COMPENSATING MEANS
Filed June 29, 1951  14 Sheets-Sheet 1

INVENTOR
Blanchard D. Smith
BY
Jewett Mead Browne & Schuyler
ATTORNEYS

March 5, 1957

B. D. SMITH 2,783,945

NUMERAL WHEEL INDICATION COMPENSATING MEANS

Filed June 29, 1951

INVENTOR

*Blanchard D. Smith*

BY *Jewett, Snead, Browne & Schuyler*

ATTORNEYS

March 5, 1957 B. D. SMITH 2,783,945
NUMERAL WHEEL INDICATION COMPENSATING MEANS
Filed June 29, 1951 14 Sheets-Sheet 5

INVENTOR
Blanchard D. Smith
BY Jewett, Mead, Browne & Schuyler
ATTORNEYS

March 5, 1957 B. D. SMITH 2,783,945
NUMERAL WHEEL INDICATION COMPENSATING MEANS
Filed June 29, 1951 14 Sheets-Sheet 6

INVENTOR
Blanchard D. Smith
BY Jewett, Mead, Browne & Schuyler
ATTORNEYS

March 5, 1957 B. D. SMITH 2,783,945
NUMERAL WHEEL INDICATION COMPENSATING MEANS
Filed June 29, 1951 14 Sheets-Sheet 7

INVENTOR
Blanchard D. Smith
BY *Jewett, Mead, Browne & Schuyler*
ATTORNEYS

March 5, 1957  B. D. SMITH  2,783,945
NUMERAL WHEEL INDICATION COMPENSATING MEANS
Filed June 29, 1951   14 Sheets-Sheet 8

INVENTOR
Blanchard D. Smith
BY Jewett, Mead, Browne & Schuyler
ATTORNEYS

March 5, 1957  B. D. SMITH  2,783,945
NUMERAL WHEEL INDICATION COMPENSATING MEANS
Filed June 29, 1951  14 Sheets-Sheet 9

INVENTOR
Blanchard D. Smith
BY Jewett, Mead, Browne & Schuyler
ATTORNEYS

INVENTOR
Blanchard D. Smith
BY Jewett, Mead, Browne & Schuyler
ATTORNEYS

March 5, 1957  B. D. SMITH  2,783,945
NUMERAL WHEEL INDICATION COMPENSATING MEANS
Filed June 29, 1951  14 Sheets-Sheet 11
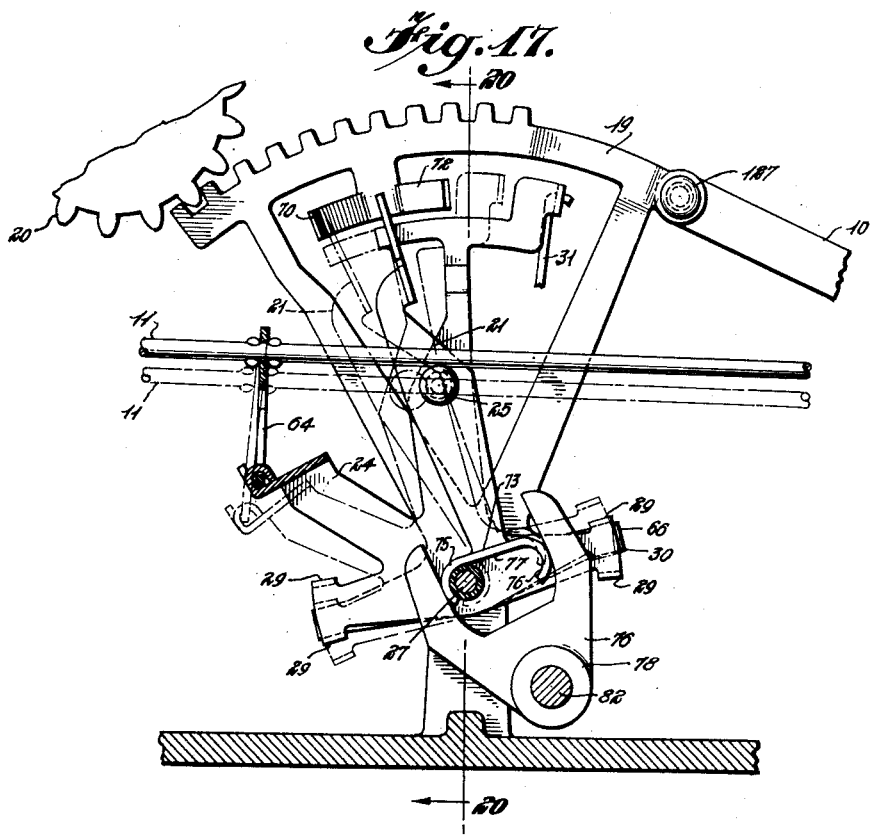
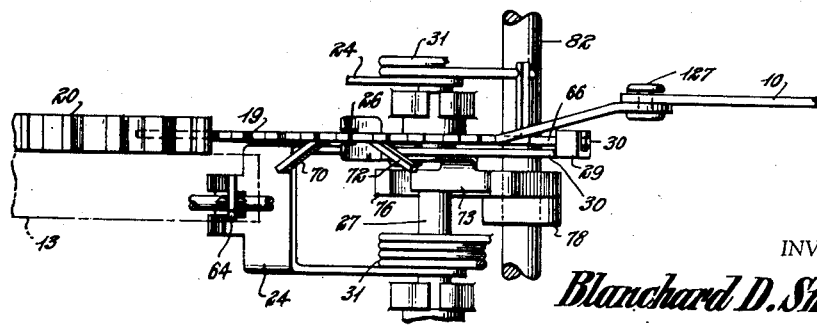
INVENTOR
Blanchard D. Smith
BY Jewett, Mead, Browne & Schuyler
ATTORNEYS March 5, 1957  B. D. SMITH  2,783,945
NUMERAL WHEEL INDICATION COMPENSATING MEANS
Filed June 29, 1951  14 Sheets-Sheet 12
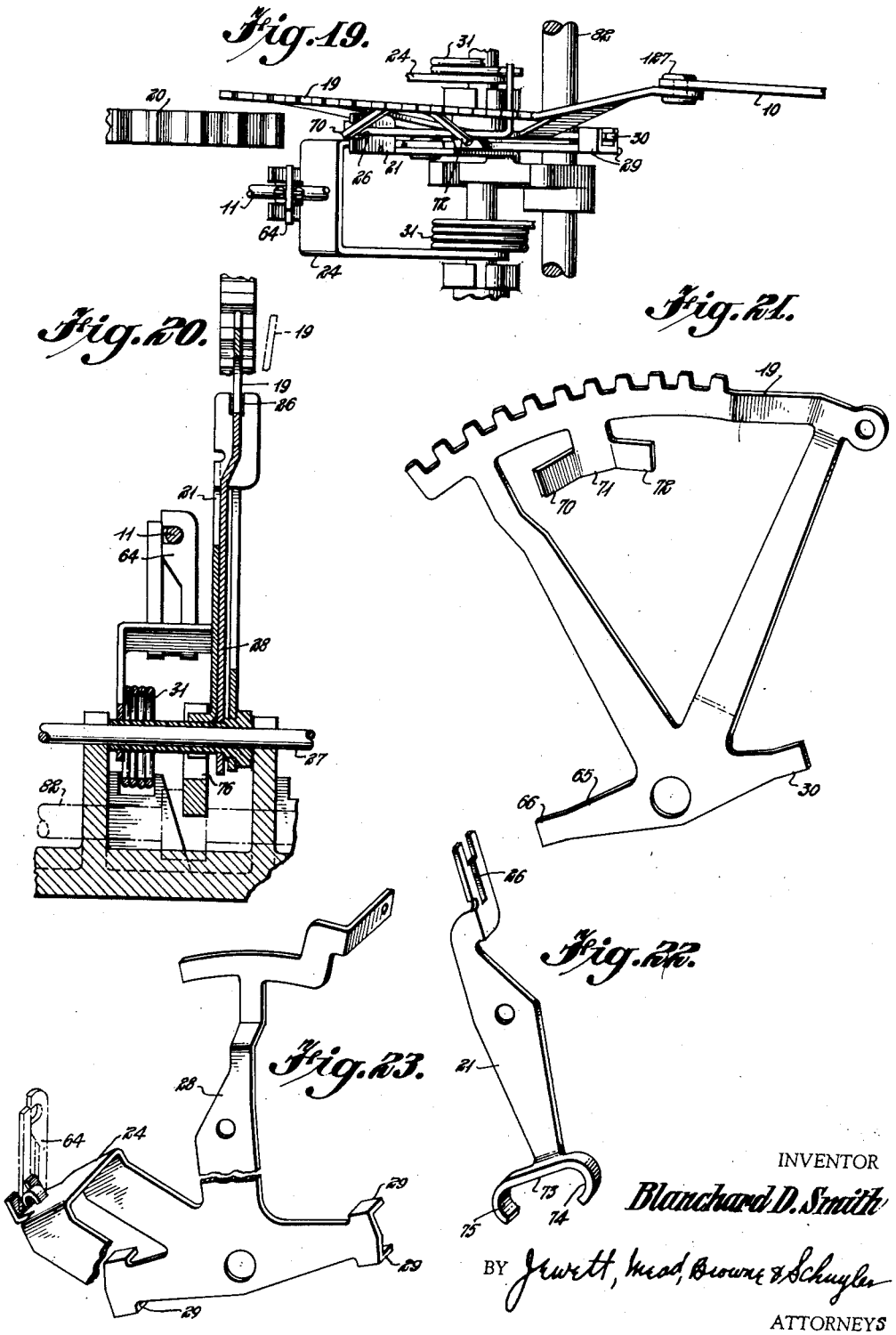

March 5, 1957   B. D. SMITH   2,783,945
NUMERAL WHEEL INDICATION COMPENSATING MEANS
Filed June 29, 1951   14 Sheets-Sheet 13
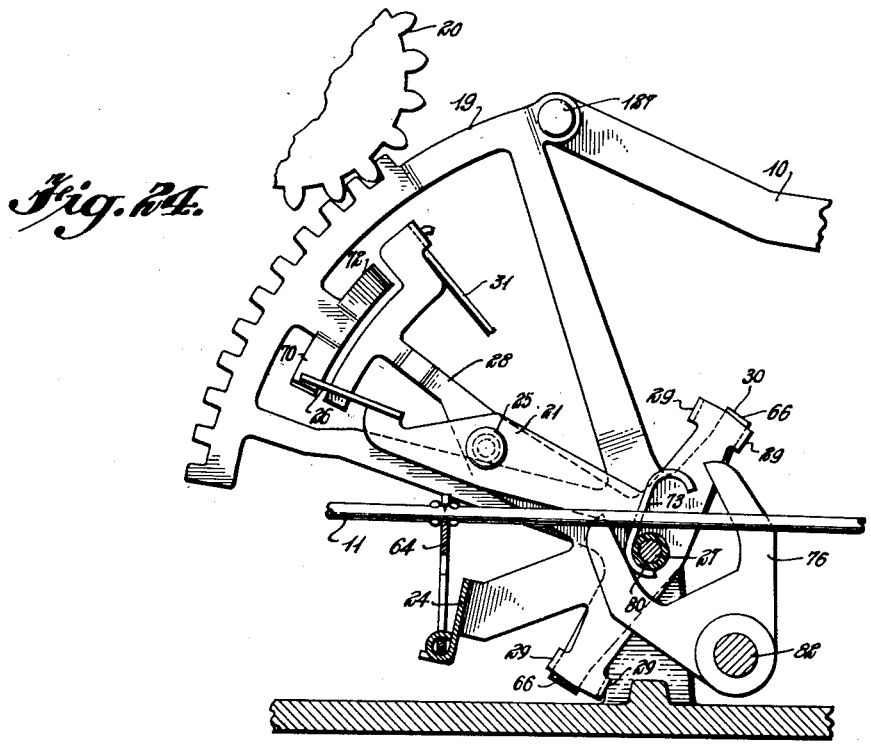
INVENTOR
Blanchard D. Smith
BY Jewett, Mead, Browne & Schuyler
ATTORNEYS March 5, 1957 B. D. SMITH 2,783,945
NUMERAL WHEEL INDICATION COMPENSATING MEANS
Filed June 29, 1951 14 Sheets-Sheet 14

INVENTOR
Blanchard D. Smith
BY Jewett, Mead, Browne & Schuyler
ATTORNEYS

United States Patent Office 2,783,945
Patented Mar. 5, 1957

2,783,945

NUMERAL WHEEL INDICATION COMPENSATING MEANS

Blanchard D. Smith, Atlanta, Ga.

Application June 29, 1951, Serial No. 234,253

3 Claims. (Cl. 235—136)

This invention relates to a calculating machine and to the construction and form of the elements and component parts making up the operative mechanism thereof.

More particularly, the present invention relates to the provision of an adding machine in which keys of a keyboard are depressed to rotate associated numeral wheels through the agency of an actuating drive mechanism.

Various constructions for numeral wheel assemblies have been employed in adding machines developed heretofore, one type being of the character described and set forth in the Gardner Patent No. 1,828,180. In the numeral wheel and shaft assembly disclosed in this patent, entocyclic gearing is utilized to accomplish the "carrying" operation as it provides a simple but effective means for transmitting crawl movement to the higher order numeral wheels from the lower order wheel. In order to accomplish either addition or subtraction on an adding machine provided with a numeral wheel assembly of this type it is merely necessary to rotate each numeral wheel according to the digital value of the particular key depressed, moving the wheels in one direction for addition and in the reverse direction for subtraction, the positioning for tens transfer being carried to the higher order wheels through the agency of the gearing arrangement.

In the machine in connection with which the present invention is described a numeral wheel assembly of the type shown in Gardner Patent No. 1,828,180 is utilized. The means by which key depressions position the numeral wheels includes a stop bar and segmental gear driving device cooperating with numeral wheel carried pinions. The stop bar and segmental gear is operated directly by depressing a key lying in one of a plurality of denominational columns on the keyboard and the movement of the segmental gear, through its cooperating wheel-carried pinion, rotates the wheel corresponding to the denominational order of the key depressed. As the forward or reverse motion of any wheel is transmitted to the higher or lower order wheels through the agency of the entocyclic gearing, "carrying" is automatically effected and addition or subtraction may be accomplished simply by sequential registration of amounts on the keyboard. It is clear that by providing actuation through the agency of a stop bar and segmental gear driving device for each of the plurality of numeral wheels in the assembly, multi-digit addition may be performed.

In adding machines conventionally constructed, some means for crawl compensation must be provided because the position of the numbers carried on the periphery of any wheel depends both upon rotation imparted to it through the agency of a corresponding driving device and, through the entocyclic gearing, the motion of a lower order wheel. Usually, some means for aligning periphery carried numerals is used, including mechanism for accumulating motion and imparting incremental rotation to the higher order wheels to accomplish tens transfer.

In the machine of the present invention a new and particularly effective means is utilized whereby the necessity for providing a crawl compensating device of the character referred to is eliminated. Rather than repositioning a numeral wheel at a particular point in its rotational operation to effect tens transfer, the present invention utilizes a viewing aperture which may be moved with respect to the periphery carried numerals on each indicating wheel so as to remain in correspondence therewith. This viewing aperture is located by a cam device operated in conjunction with the next lower order wheel. A complete cycle of operation of one numeral wheel causes the aperture viewing device to move through one corresponding cycle, thereby effecting "carrying" without disturbing normal operation of the numeral wheel assembly.

Direct subtraction may also be performed on the calculating machine of the present invention as one of the principal features comprises the provision of a novel actuating stop bar-segmental gear unit. As the tens transfer between the wheels in the numeral wheel assembly is accomplished through the agency of entocyclic gearing, "carrying" occurs during reverse rotation of the numeral wheels. The novel actuating stop bar-segmental gear unit provides a means whereby the numeral wheels may be rotated in reverse direction corresponding to keyboard registered amounts. A simple and effective mechanism operative as a segmental gear shifting arrangement comprises another important feature of the present invention.

It is an object of the present invention, therefore, to eliminate crawl compensating devices and extra cyclic adjusting mechanisms in an adding machine utilizing entocyclic gearing in the numeral wheel assembly.

It is another object of the present invention to provide a simple and effective means operative in conjunction with the numeral wheel assembly to effect tens transfer or "carrying."

It is a further object of the present invention to provide a novel gear drive mechanism for positioning a series of numeral wheels in a casing carried assembly. It is a still further object of the present invention to provide a peculiar and unique cooperative drive for said casing carried assembly which will permit both direct subtraction and direct addition to be performed.

It is another object of the present invention to provide a clearing mechanism for a casing carried numeral wheel assembly which will effectually re-align the wheels in the assembly in zero or initial position.

It is another object of the present invention to provide the beforementioned advantages in a simple and easily manufactured machine.

The invention will be described in connection with the accompanying drawings, in which:

Fig. 17 is a view showing in detail the segmental gear and support therefor of the drive unit mechanism;

Fig. 18 is a plan view of the segmental gear and support therefor;

Fig. 19 is a plan view of the segmental gear in its out of engagement position with respect to the numeral pinion;

Fig. 20 is a section taken along lines 20—20 of Fig. 17;

Fig. 21 is a detail view of the segmental gear portion of the driving mechanism;

Figs. 22 and 23 are enlarged views of the pivot arm and rocking actuator;

Figs. 24 and 25 are views showing the segmental gear rocked forward in the out of mesh position with respect to the numeral wheel pinion, the parts being in adding relationship;

GENERAL DESCRIPTION

Figure 1:
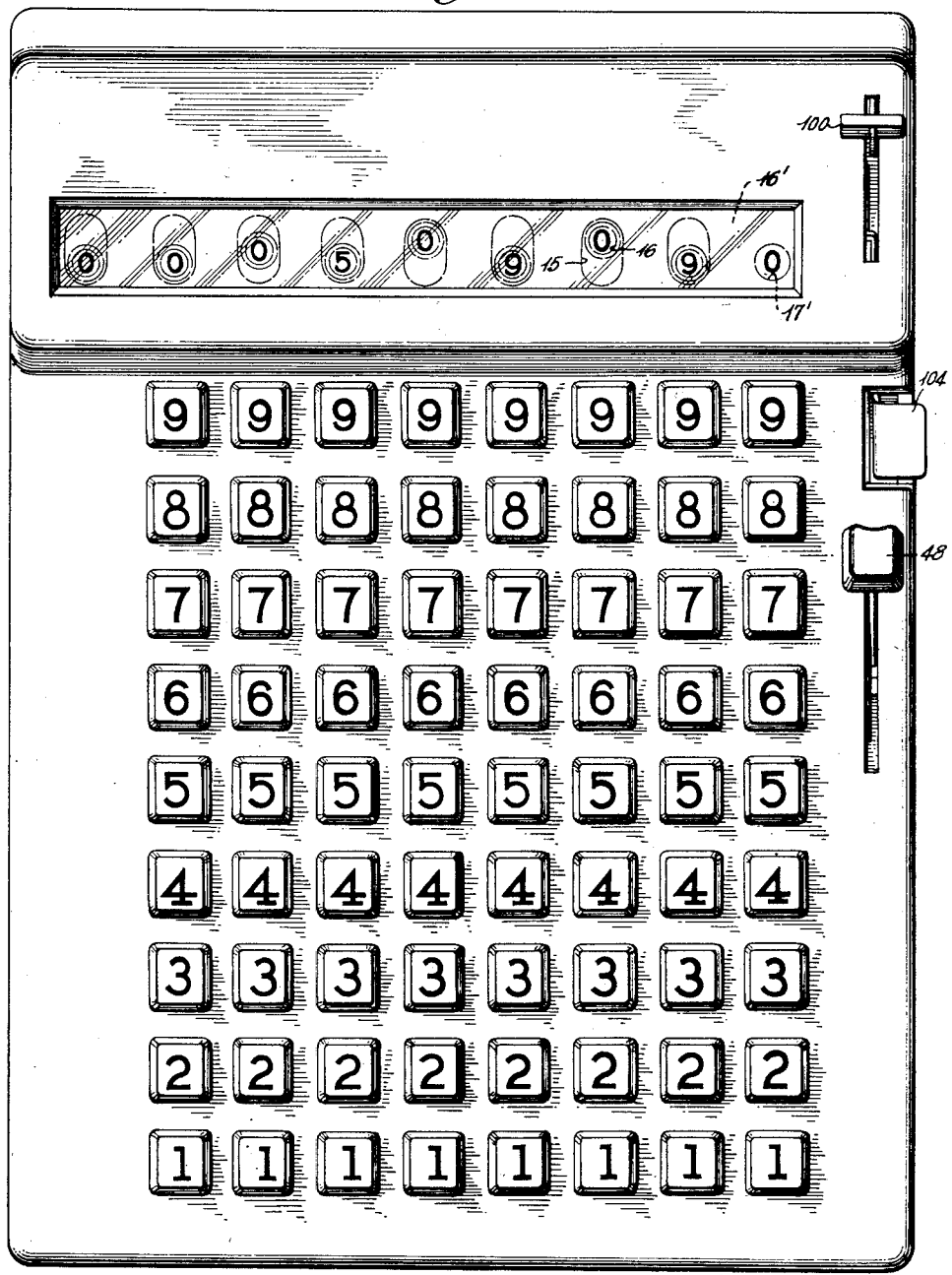
Fig. 1 is a plan view showing the casing and keyboard for an adding machine embodying the teaching of the present invention and revealing the viewing apertures.

The keyboard of a machine embodying the present invention (as shown in Fig. 1) comprises a plurality of keys arranged in columns, each corresponding to a related numeral wheel 13 which may be viewed through an aperture visible at the top of the machine casing. To effectuate operation of the machine, a key is depressed corresponding to the amount to be registered, which depression is transmitted through the agency of a driving mechanism to the corresponding numeral wheel.

Figure 2:
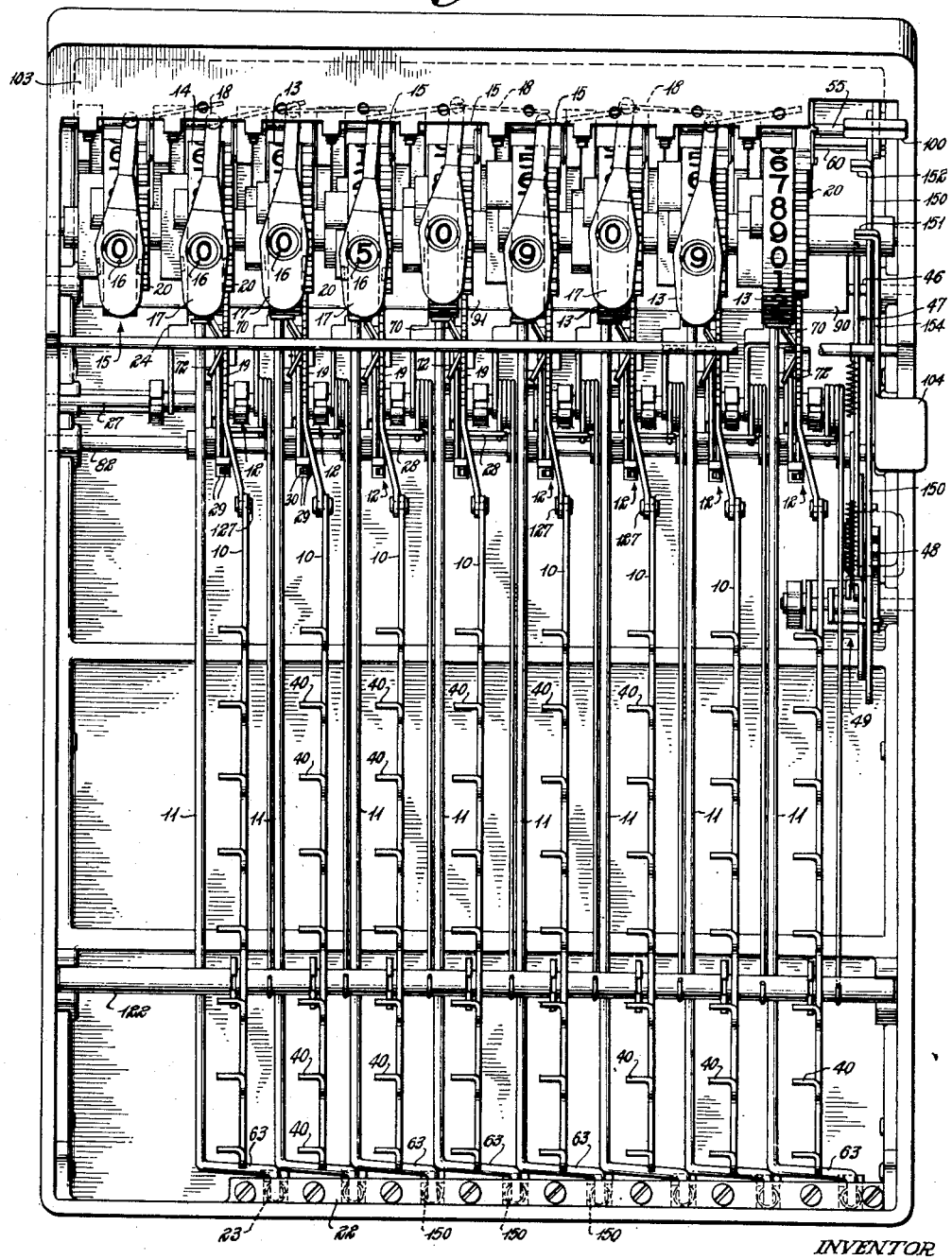
Fig. 2 is an elevation taken with the cover and keyboard removed.

The driving mechanism utilized in a preferred embodiment of the invention comprises, as seen in Fig. 2, a plurality of longitudinally disposed stop bars 10 and crank arms 11 pivotally supported in the adding machine casing. By depressing a key, vertical disposition of the related crank arm is effected which, through a linkage designated generally as 12, transmits movement to the corresponding numeral wheel 13.

As was stated above, entocyclic gearing (not shown in the drawings) in a numeral wheel assembly of the kind disclosed in Patent No. 1,829,180 is provided for moving the next higher order wheel 14 (Fig. 2) in response to positioning of the lower order wheel 13. A viewing aperture device is also provided for each numeral wheel except the numeral wheel of the lowest order, designated generally at 15, comprising an aperture 16 in a horizontally disposed window plate 17 pivotally carried by support 18. The numeral wheels have a corresponding and an associated viewing aperture device and a driving mechanism, however, the machine will be described by referring to the mechanism associated with one numeral wheel, it being understood that a similar mechanism is provided for each numeral wheel.

Figure 4:
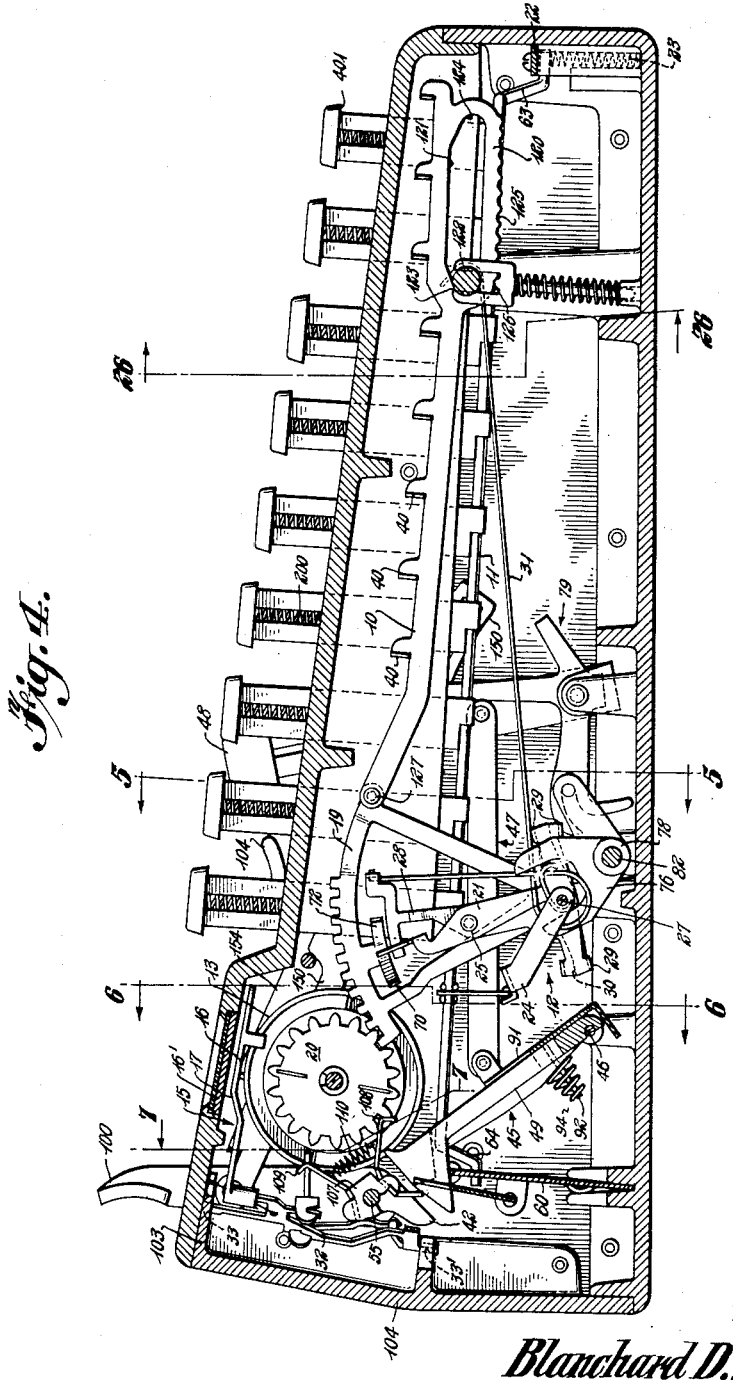
Fig. 4 is a section taken along lines 4—4 of Fig. 1, revealing the stop bar and segmental gear unit drive mechanism and the viewing aperture operating mechanism.

As seen in Fig. 4, the segmental gear 19 when rocked forward, drives the numeral wheel pinion 20. Upon depression of a key causing vertical disposition of the crank arm 11, rocking movement of the segmental gear 19 and rotation of the numeral wheel pinion 20 is effected through the linkage designated generally as 12.

The segmental gear 19 is tiltably supported so as to be movable laterally into and out of mesh with the numeral pinion 20. This moving into and out of mesh is accomplished through the agency of a camming device carried cooperatively by the segmental gear 19 and the pivot arm 21. The linkage 12, by which movement of the crank arm is transmitted to the segmental gear 19 and the numeral wheel pinion 20, is operable to effect both tilting and driving of the segment. The crank arm 11 is pivoted at the front and at the rear of the housing, supported by stop 22 and spring 23 at the rear and at the front of the housing in plate 60.

Figure 5:
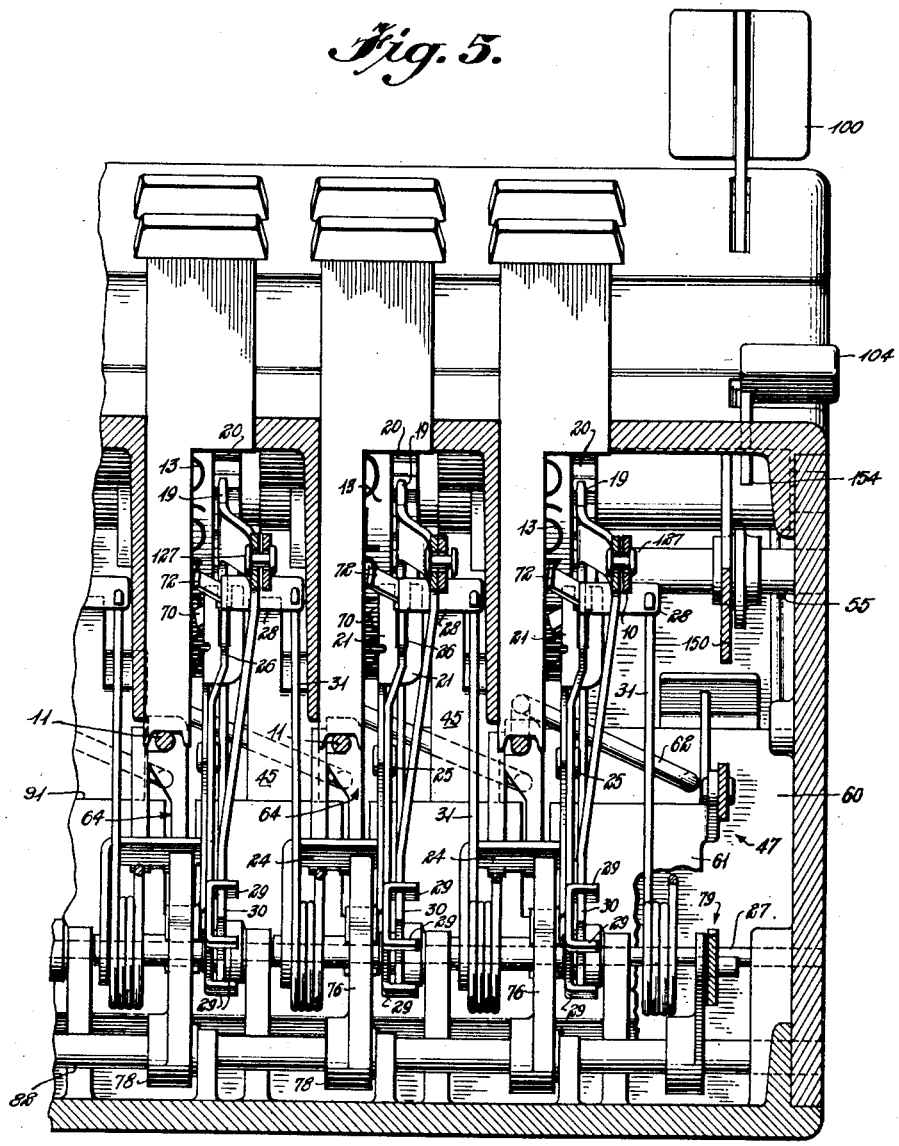
Fig. 5 is a detail view taken on lines 5—5 of Fig. 4, showing the crank arm of the stop bar and segmental gear driving mechanism and the relation thereof with respect to the numeral wheel assembly.

Arm 24 is engaged by connecting link 64 (Fig. 5) of the said crank arm 11, and transmits the vertical movement of the crank arm to the rocking actuator 28 which, in turn, engages and drives the segmental gear. Pivot arm 21 is carried on rocking actuator 28 supported by pin 25 (Fig. 17) and moves independently of said segmental gear 19 and relatively thereto through a small angle so as to provide in cooperation with cam lips 70, 72 carried on the segmental gear, the cam action for tiltably adjusting the segmental gear 19 with respect to the numeral wheel pinion 20.

In adding, the segmental gear 19 is positioned at rest, as shown in Fig. 17, in mesh with the numeral wheel pinion 20. When a key is depressed, the initial vertical displacement of crank 11 causes the cam slot 26 of pivot arm 21 to move with respect to the segmental gear 19 and the cam lips 70, 72 carried thereon, which action causes the segment to be tilted out of mesh with the numeral wheel pinion. The continuing vertical displacement of the crank arm 11 operates to drive the segment forward in this out of mesh position (Figs. 24 and 25) a varying distance depending upon the digital value of the particular key depressed. When the key is released and rises, crank arm 11 follows, initially causing relative movement between the cam slot 26 and the cam lips 70, 72 carried on the gear segment 19 and thereby returning the gear segment 19 into mesh (shown in Fig. 18) with the numeral wheel pinion, continuing movement of the crank arm 11 being effective to drive the pinion in counterclockwise direction during return of the gear segment to the at rest position in which it is shown in Fig. 17.

Figure 12:
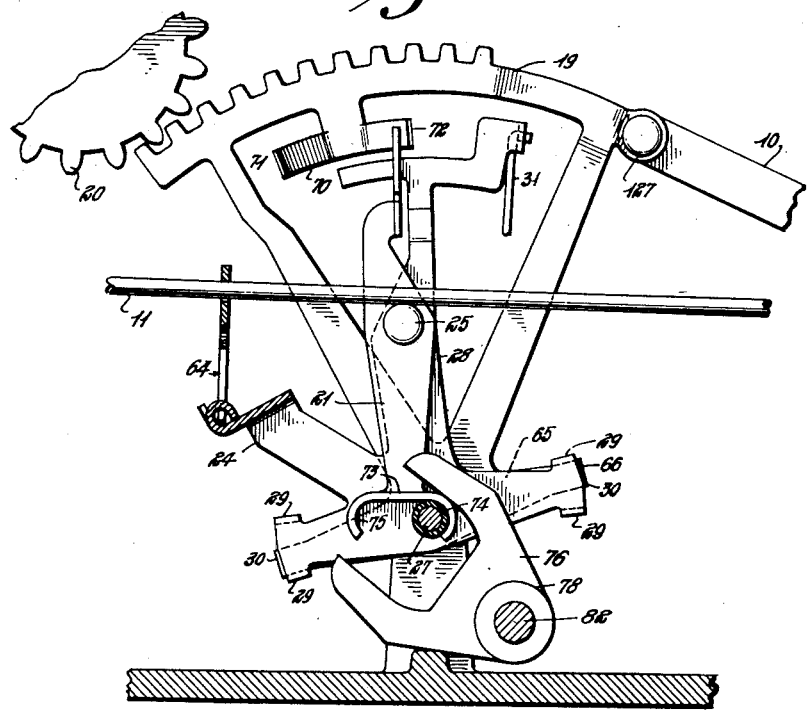
Fig. 12 is a view of the segmental gear and the actuating linkage therefor, with the pivot arm set in subtracting position.

In subtraction, the segmental gear 19 is positioned at rest, as shown in Figs. 12 and 19, out of mesh with the numeral wheel pinion 20. When a key is depressed, initially the pivot arm 21 and cam slot 26 move forward with respect to the segmental gear 19 and the cam surfaces 70, 72 carried on the gear, so as to tilt the gear segment into mesh with the numeral wheel pinion 20. Continuing movement brings flanges 29 into engagement with the foot 30 to move the segment forward in mesh with the numeral wheel pinion 20 in order to drive the pinion in a clockwise direction. The gear segment 19 is cammed out of mesh by the action of the cam slot 26 on the camming lips 70, 72, when the key is raised and the gear segment 19 is returned to initial position out of mesh with the numeral wheel pinion.

Figure 10:
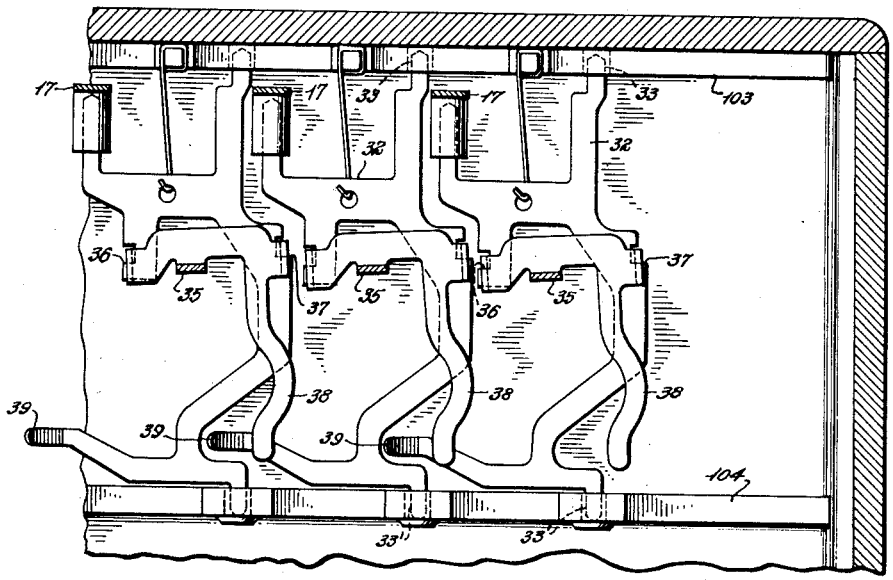
Figs. 10 and 11 show in detail the viewing aperture assembly and support positioning means.
Figure 11:
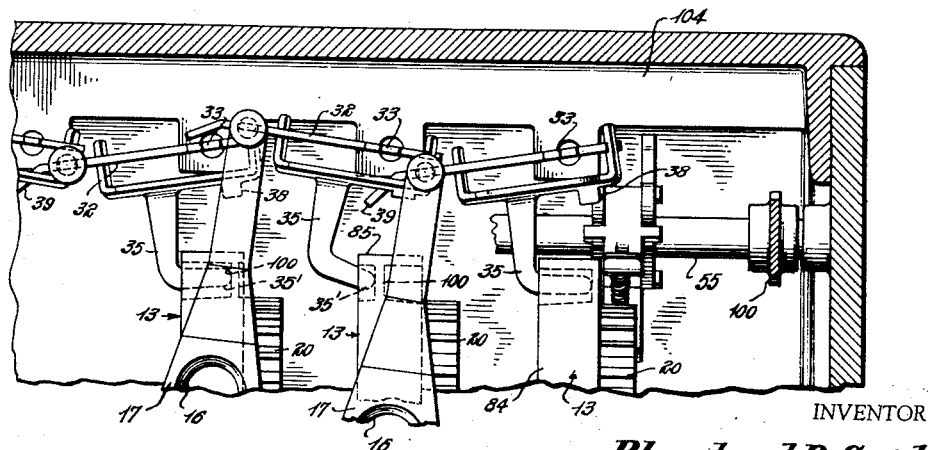
Figure 13:
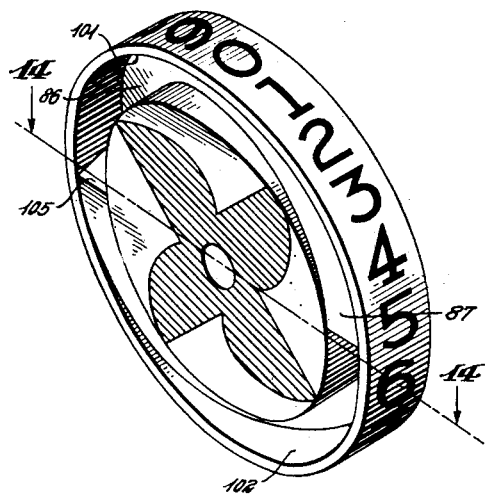
Fig. 13 is an isometric view of the numeral wheels with the clearing cams removed.
Figure 15:
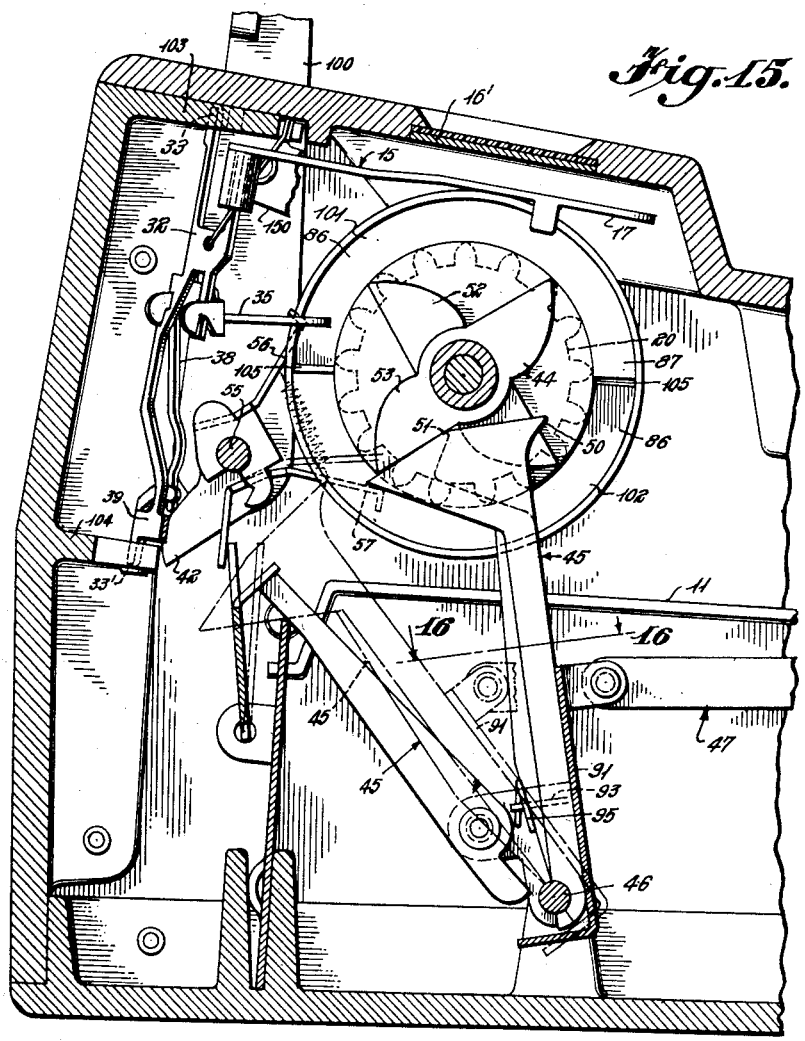
Fig. 15 is a view revealing the clear rake and mechanism as it relates to the numeral wheel assembly.
Figure 16:
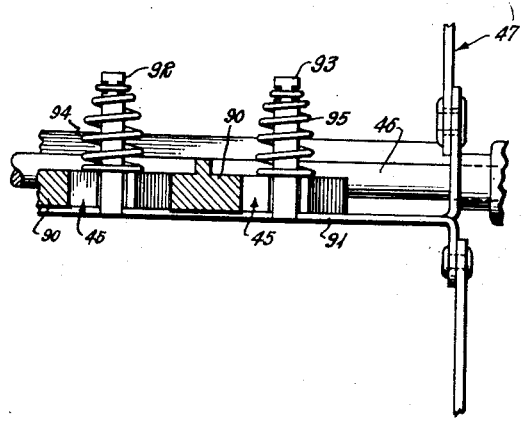
Fig. 16 is a section taken along lines 16—16 of Fig. 15, illustrating the clear rake support.

As shown in Fig. 13, each numeral wheel is provided with cam grooves 101, 102, of varying depth, adjacent the periphery of the wheel in the side thereof for cooperation with finger 35 (Fig. 11) to position the aperture viewing mechanism for the next higher order wheel. The aperture viewing mechanism for the numeral wheel of the lowest order comprises a stationary window plate 16' provided with a viewing aperture 17'. The aperture viewing mechanisms for the higher order numeral wheels, as shown in Figs. 10, 11 and 15, comprise a window plate 16 horizontally disposed and pivotally supported in the casing above a corresponding numeral wheel. The support for said window plate 16 comprises a member 32 having vertically aligned pivot posts 33, 33' hung in the casing in plates 103, 104. Finger 35 is disposed in the cam groove of the lower order numeral wheel for adjustment of the member 32 and the window plate 16 about the axis of pivot posts 33, 33' determined by the rotational disposition of the wheel. The cam grooves in each numeral wheel (Fig. 13) comprise a sloping surface 100 of gradually increasing depth and a shoulder step portion 105 between adjacent cam grooves.

During a complete cycle of operation, beginning when the finger 35 lies in the deepest position of a cam groove, the finger rides up the gradually sloping cam surface 100 and thereby adjusts the position of window plate 16 determined by the depth of the cam provided on the next lower order numeral wheel. Conventionally, each numeral wheel is provided with two series of numbers on its periphery, making it necessary to provide two cams corresponding to the two sets of digits. One cycle of operation, therefore, consists of a 180° movement of the numeral wheel and corresponding movement of the finger 35 from the deepest portion of one groove to the deepest portion of an adjacent cam groove.

The finger 35, hung on the support member 32 in horizontally aligned slots 36 and 37, has a depending leg 38, integral with finger 35, movable by arm 39 of the next lower order window support member 32.

The window plates 16, carried by supports 32, move between a forward or initial location to a back or final location in accordance with the pivotal movement of the fingers 35 about the axis of the vertically aligned pivot posts 33, 33'.

Taking for illustration when the total $0,999,999.99 is registered on the machine, the window plates above the numeral wheels (except the stationary "penny" wheel window plate) will be in their final location because all the wheels, through fingers 35, have shifted the associated window plates rearwardly. If "one cent" is added to the "penny" wheel, the numeral "0" then appears in the aperture above the "penny" or lowest order wheel. The finger 35 riding in the cam groove of this lowest order wheel drops into the deepest portion of the groove from the shallow portion where it was previously located, thereby causing the window plate associated with the lowest order (penny) wheel and positioned above the next higher order wheel to move from the final or back location to the forward or initial position. When the lowest order (penny) wheel is rotated, the higher order wheel is caused to crawl and bring the numeral "0" into view below the now forwardly located window plate aperture.

The finger 35 and integral depending leg 38 lie 90° apart in a vertical plane and are adjustable about the horizontal slots 36, 37 by the arm 39. Arm 39 moves forward with the support member 32 for the lower order (dime) window plate 16 and engages and moves the depending leg portion 38 of the next higher order (dollar) wheel. The finger 35 is lifted over the stop portion of the lower order (dime) numeral wheel cam groove and dropped into the deepest portion of the groove, thereby causing the support 32 of the next higher order (dollar) wheel to pivot about the vertical axis of posts 33, 33'. The next higher order (dollar) numeral wheel window plate moves forward and the numeral "0" is visible in the aperture. The operation whereby the arm 39 moves forward and contacts the depending leg 38 of the support 32 for the window plate corresponding to the next higher order wheel to lift the finger 35 proceeds in sequence across the casing, raising the numeral "0" in each of the apertures in which the numeral "9" originally appeared. The highest order numeral wheel window plate is also shifted forwardly from the rear location in which it was originally positioned. The numeral "0" originally visible is thereby masked and the numeral "one" is brought into view. The operation of the window plate assembly has effected the addition of "one penny" to the total originally registered on the machine.

During subtraction the window plate assembly is removed from operative relationship with the numeral wheel assembly. For illustrative purposes let us suppose $5,000,000.00 is visible at the top of the machine casing in the apertures provided in the window plates and one "penny" is to be subtracted from the total. After the window plate assembly has been removed from operative relation and the drive mechanisms have been conditioned for subtraction, the lowest order (penny) wheel is rotated in subtraction fashion through a distance corresponding to the distance between adjacent numerals on the wheel. The numeral "nine" is then visible in the stationary aperture corresponding to the lowest order wheel. The higher order wheels crawl the proper distances (in subtraction fashion) through the agency of the entocyclic gearing. Upon return of the window plate assembly to the operative position, the finger 35 of the (dime) window plate assembly 16 associated with the lowest order (penny) wheel is positioned in the shallow portion of the cam groove provided in this wheel. The associated (dime) window plate assembly, therefore, is positioned so as to locate the window plate thereof in back location, with the numeral "nine" visible in the aperture above the next higher order (dime) wheel. Arm 39, integral with support 32 of the window plate 16, is moved back, causing the finger 35 (through depending leg portion 38) to be lowered and thereby positioned in the shallow portion of the cam groove of the next higher order wheel. This, in turn, causes the associated window plate (dollar) to be positioned in back location and the numeral "nine" is then visible in the aperture provided in that window plate. It is clear this back location positioning is the same for each window of the plates corresponding to the higher order wheels in the assembly.

The numeral "four" is now visible in the window plate aperture corresponding to the highest order wheel. The window plate has been shifted from the original forward location where the numeral "five" was visible in the aperture to the rear location where the numeral "four" is visible in the aperture. This is caused by the rearward movement of arm 39 of the next lower order window mechanism which, through leg 38, lowers finger 35 causing the finger 35 to be positioned in the shallow portion of the cam groove.

As each numeral wheel carries two sets of digits on its periphery, there are 18° between adjacent numbers and each aperture moves a corresponding distance between its forward and back location so as to be properly positioned above a number through the entire extent of the crawl movement caused by the entocyclic gearing. A cycle of operation of movement between "0" and "0" of the lower order wheel will transmit an 18° movement to the next higher order wheel through the agency of the entocyclic gearing, and an 18° movement of the related aperture device and return to the initial position through the agency of the wheel cam groove and related finger and window mechanism. This effects "carrying" because rotational movement of the higher order wheel corresponding to the distance between two digits must occur for a complete cycle of the lower order wheel.

Whereas, in the prior art, some means for storing the crawl of the higher order wheel has been provided for periodically effecting incremental adjustment and thereby effecting "carrying," in the present invention the movement of the window mechanism in conjunction with the entocyclic gear transmission accomplishes "carrying."

As was above described, during addition, cam slot 26 operates to pivot the gear segment out of mesh with the numeral wheel pinion and driving of the numeral pinion is performed upon return of the gear segment to initial position, while during subtraction the gear segment remains in engagement and drives the numeral wheel pinion during forward movement, being returned out of engagement to its initial position.

Some means for displacing the window assembly out of operative position must be provided when subtraction is performed on the machine because when the wheels are rotated clockwise, the shoulder in the cam groove would act as a stop when contacted by the finger 35. Shaft 55 (Fig. 15) horizontally disposed and oscillatable in the machine is provided with a plurality of cam lugs 42 for engaging arm portions 39 of the window support members. Handle 100 is provided for rotating shaft 55 and transmitting, through cam lug 42, movement to the window support member 32.

When it is desired to ready the machine for subtraction, the handle 100 is operated to move the window support members 32 out of operative position and thereby disengage finger 35 from the next higher order wheel.

Figure 14:
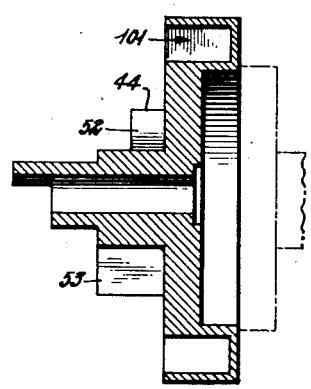
Fig. 14 is a sectional view of a numeral wheel taken along lines 14—14 of Fig. 13.

A rake, cooperating with cam shoulders 52, 53 carried on each numeral wheel, is provided to clear the machine. The wheels are cleared to "0" by rotating in counter-clockwise direction through the agency of the rake and a cam assembly. A double cam surface 44 is provided on each wheel, as shown in Fig. 14, so as to provide a simple and effective means for rotating the numeral wheel.

Figure 27:
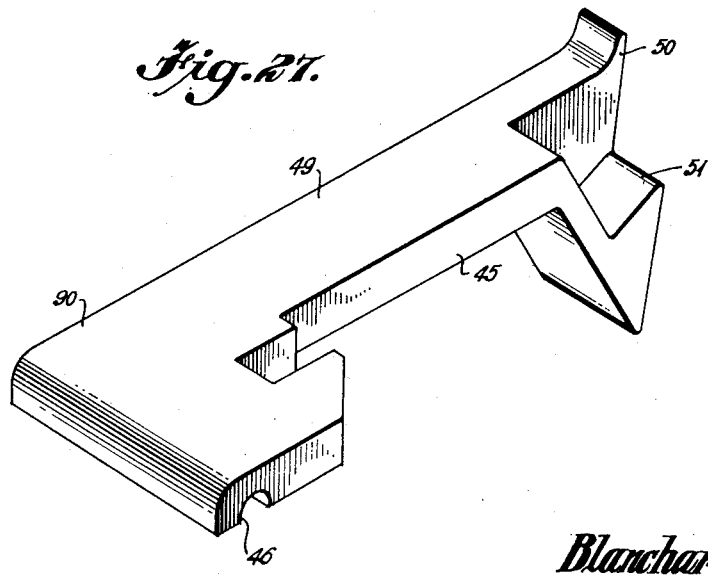
Fig. 27 is an enlarged view of the clear rake which is utilized in the preferred embodiment of the present invention.

As shown in Fig. 27, the rake 45 comprising body portion 49 and contacting end portions 50, 51 is pivoted at 46 (Fig. 15) to be driven through linkage 47 from handle 48. The cam surfaces 44 provided on each numeral wheel comprise shoulders 52 and 53, shoulder 53 being higher than shoulder 52. Rake 45 swings into engagement with cam surface 44, initially contacting raised portion 53 and after partial rotation, completing clearing to "0" through end 51 and lower portion 52. It is seen that the rotation is performed in two stages, first through initial rotation by end 50 of the rake, and completed through end 51 and the lower cam portion carried by the wheel.

Figure 8:
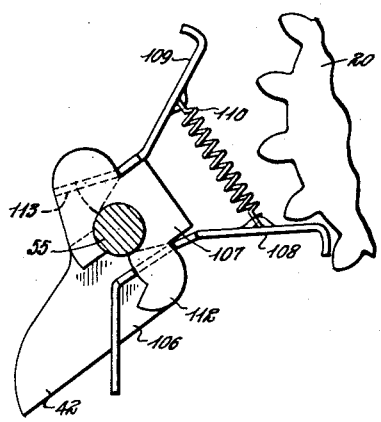
Fig. 8 is an illustrative showing of the ratchet assembly including the shaft supported carrying assembly.
Figure 9:
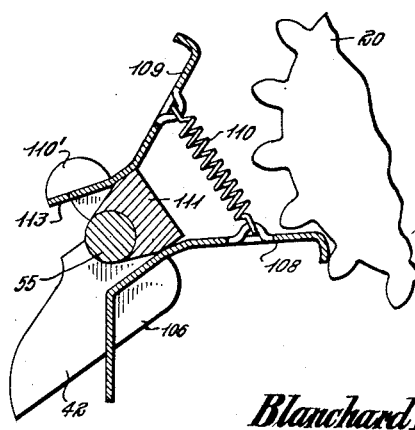
Fig. 9 is a sectional view taken along lines 9—9 of Fig. 7 of the structure of the ratchet carrying assembly.

As shown in Figs. 8 and 9, a ratchet assembly is positioned adjacent the numeral wheel pinion to provide a means for limiting rotational movement of the numeral wheel. Shaft 55 has affixed thereto carrying plates 106, 107 arranged to support ratchet arms 108, 109. Spring 110 fastened between ratchet arms 108, 109 biases said arms in position with respect to the numeral wheel pinion. By rotating shaft 55, plates 106 and 107 supporting the ratchet arms are positioned in alternatively adding or subtracting relationship and it is clear that when either ratchet arm 108 or 109 is in position to engage the numeral wheel pinion, rotation of the pinion in one direction is prevented. When ratchet arm 109 is engaged with the numeral wheel pinion through the agency of the shaft 55 and the assembly carried thereon, clockwise rotation can occur but counter-clockwise rotation is prevented and when ratchet arm 108 is engaged with the pinion clockwise rotation is prevented while counter-clockwise rotation can occur. Plate 106 has a lateral projection 110' which, in cooperation with the V-shaped armature 111, positions the related ratchet arm 109. Plate 107 has a similar lateral projection 112 for positioning, in cooperation with the said V-shaped armature 111, the related ratchet arm 108. By constructing the assembly so as to allow play of the portion 113 of the ratchet arm 109 in the groove present between lateral projection 110' and the armature 111, during rotation of the shaft between adding and subtracting position the ratchet arm 108 remains in mesh with the numeral wheel pinion until ratchet arm 109 comes into engagement with the numeral wheel pinion. A similar action occurs during rotation of the shaft from subtracting to adding position, the ratchet arm 108 remaining in engagement with the numeral wheel pinion until ratchet 109 comes into engagement therewith. The construction of the ratchet assembly permits continuous control over the rotational disposition of the numeral wheel pinion and the related numeral wheel.

*Specific description of numeral wheel driving mechanism*

As set out above in the General Description of the invention, the driving unit for each numeral wheel (Fig. 2) comprises a longitudinally disposed stop bar 10 and a cooperating segmental gear 19 which is moved through the agency of a crank arm and transmitting linkage.

Figure 6:
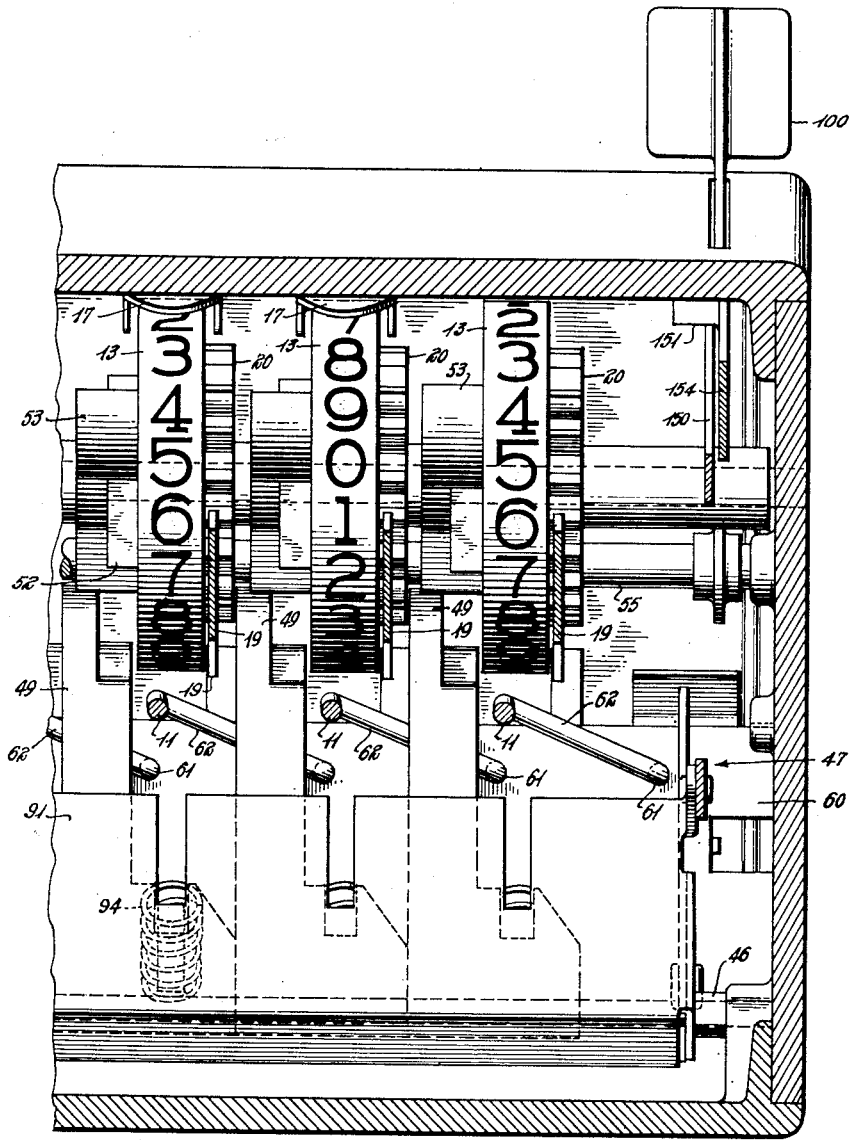
Fig. 6 is a detail view taken on lines 6—6 of Fig. 4, showing the numeral wheel assembly and crank pivot arm.
Figure 7:
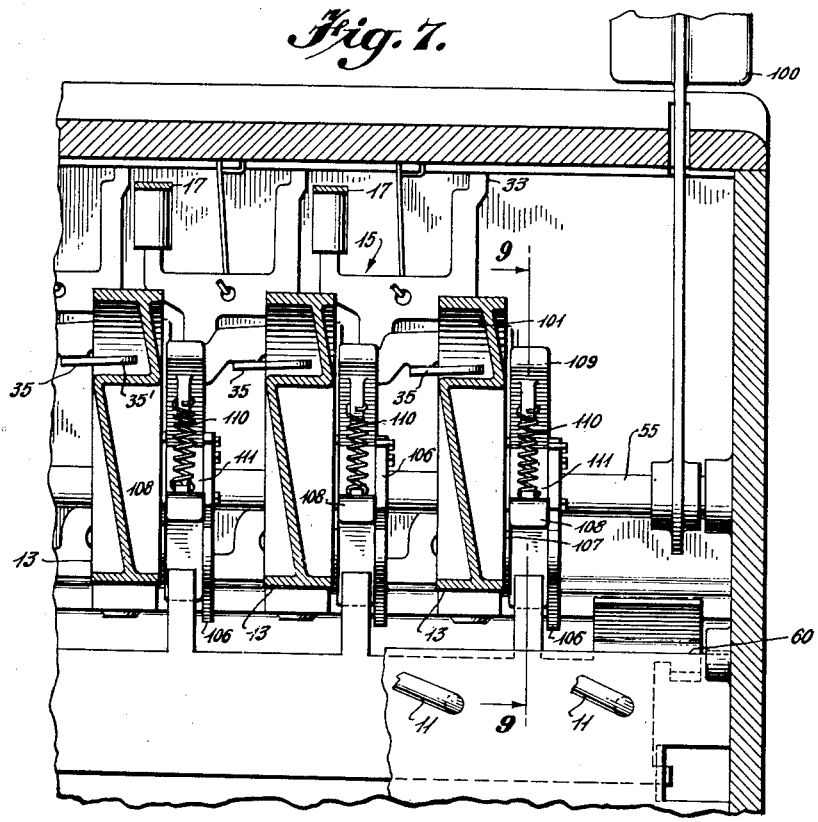
Fig. 7 is a view taken on lines 7—7 of Fig. 4, showing in detail the aperture viewing mechanism and positioning means.

In Fig. 6, a detail view taken along line 6—6 of Fig. 4, the forward support means for the crank arm may be observed. Plate 60, transversely supported in the housing, is provided with sockets 61 spaced for the reception of crank arms 11 for each of the numeral wheels disposed in the machine.

Figure 26:
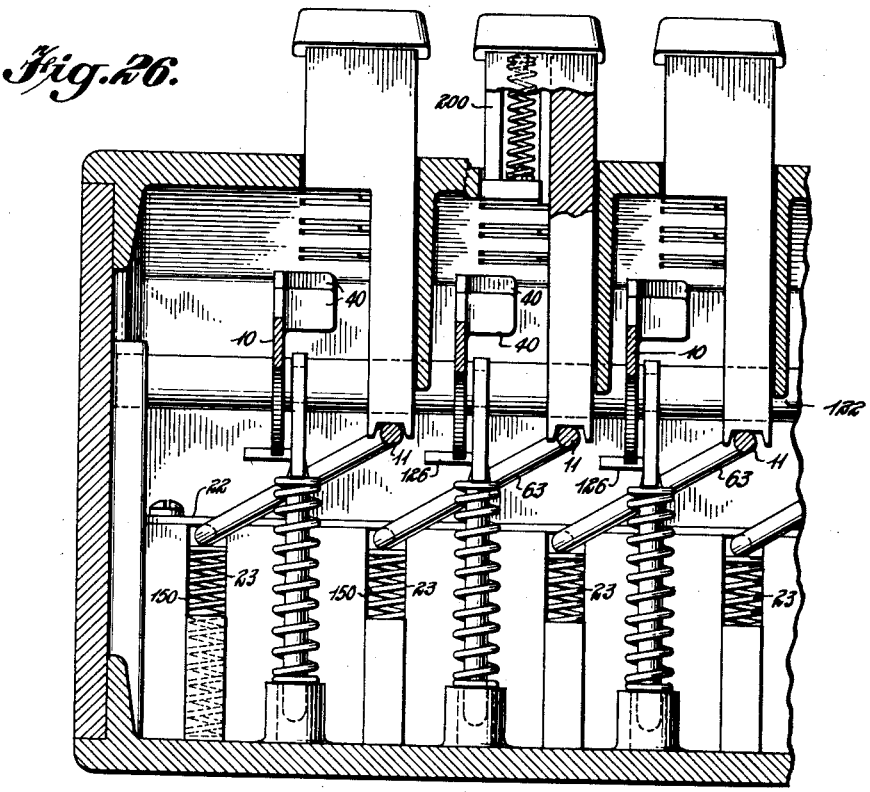
Fig. 26 is a section taken through lines 26—26 of Fig. 4 partly broken away and shows the rear end support for the crank arm of the stop bar and segmental unit driving mechanism.

The rear pivot for crank arms 11, which comprises casing-carried stops 22 and vertically arranged horizontally spaced springs 23, is shown in Fig. 26. Each crank arm 11 throughout its length is disposed beneath one of the plurality of key columns and may be displaced vertically by depressing any of the keys in the column. Vertical displacement of the crank arms 11 is transmitted to the segmental gear 19 through the agency of arm 24 of pivot unit 21. The crank arms 11 comprise straight sections terminating in offset portions 62 and 63 at their respective ends and cooperate with a pivoted connecting link 64 (Fig. 5) for driving arm 24 of the pivot arm unit 21. By depressing a key, the crank arm is depressed and thereby relatively disposed in a vertical manner to an extent dependent upon the vertical depression of the key.

The stop bar 10 carries stop elements 40 (Figs. 2 and 4) which are engaged by the keys depressed, upon forward movement of the stop bar. The extent of forward movement permitted is determined by the key engaged, therefore, the extent of movement transmitted to the numeral wheel driving pinion will be variable and, accordingly, dependent upon the digital value of the key depressed.

As shown in Figs. 21 through 23, the segmental gear 19 carries cam lips 70, 72 which are disposed in a slot 26 on the pivot arm 21. The pivot arm 21 is rotatably supported on rocking actuator 28 by pin 25 and is positionable relative to shaft 27 (Fig. 18), the limit stops 74 and 75 defining the extent of rotational movement permitted about the pin 25. Upon relative movement between the arm 21 and the segmental gear, the latter is cammed out of engagement with the numeral wheel pinion 20 through the cooperating slot 26 and cam lip 70 or 72. The parts comprising the camming linkage are shown in position for adding in the enlarged detail view of Fig. 18. Yoke 76 is rocked through the agency of a linkage of be hereinafter described in order to prepare the machine for adding, so as to position the pivot arm 21 with the flat portion 77 of shoe 73 resting on the supporting shaft 27. The slot 26 of pivot arm 21 is disposed in the center portion 71 of the segmental gear carried cam, the parts in the position shown being in readiness for the performance of addition.

The spring 23 (Fig. 26) by presenting a yieldable support for the rear end of the crank arm permits full depression of each of the keys in a column. It is clear that upon depression of rearmost key 401 (Fig. 4), the crank arm end rides vertically downward in the receiving slot 150 provided at the rear end of the casing, against the action of the spring 23, causing relatively smaller vertical disposition of the connecting rod 64 because of the length of the crank and small angle of movement registered at the connection near the front pivot support. The stop bar 10 is driven forwardly, responsive to the vertical disposition of the crank arm, until stop 402 comes into contact with the depressed key 401, which limits forward movement.

A similar action occurs when each key in the column is depressed, the crank arm 11 being driven downwardly and the stop bar driven forwardly a distance corresponding to the digital value of the key, however, the higher order keys operate to cause relatively greater vertical displacement of the crank arm and the connecting rod 64.

Crank arm 11 through connecting rod 64 rotates rocking actuator 28 about its pivot 27, and pivot arm 21 carried by the rocking actuator 28 operates to cam the driving segment into or out of mesh with the numeral pinion. By providing spaced flanges 29 on the foot portion 30 of rocking actuator 28, movement corresponding to vertical displacement of the crank arm is transmitted to the segment through bar 65. End portion 66 of bar 65 rides within spaced flanges 29 so as to permit pivotal play and relative movement between forward and return driving engagement. This permits, in adding, the cam slot 26 to ride forward into engagement with cam 70 and tilt segment 19 out of mesh with numeral pinion 20, at the beginning of the key stroke and prior to segment driving engagement of the flanges 29 and bar 65.

Upon reaching the full extent of forward travel determined by stop 402 coming into engagement with the depressed key 401, the pivot arm 21 remains in camming relationship with the cam 25 to maintain the segment out of mesh. Upon initial return movement of the rocking actuator 28, the slot 26 rides to the middle portion 71 of cam 25, tilting the segment into mesh with the numeral wheel pinion. Upon further rotational movement of the rocking actuator 28 in return fashion, the numeral wheel pinion is driven by the gear segment 19 to rotate the engaged numeral wheel.

Subtraction, on the other hand, is performed by driving the numeral wheel during forward movement of the gear segment 19. As described above, cam portions 70, 72 are offset so as to pivot segment 19 out of mesh upon relative movement of the pivot arm. U-shaped shoe portion 73 of pivot arm 21 rides on shaft 27, and is of elongate form so as to provide arcuate shaft engaging surfaces 80, 81. Reverse yoke 76 positions shoe 73 with respect to shaft 27 in either alternative position, and is operated through the agency of linkage 79 (Fig. 4) and actuating handle 48. Upon movement of the handle 48 to subtract position (Fig. 12), the yoke 76 is pivoted about its supporting shaft 82 to engage surface 81 with shaft 27. Slot 26 on pivot arm 21 is moved relative to the cam 25, so as to be positioned in engagement with portion 72 of cam 25, whereby pivoting segment 19 out of mesh with numeral wheel pinion 20.

Segment 19 will be held out of mesh with numeral wheel pinion 20 in the initial at rest position, and upon depression of a key and rotational movement of pivot arm 21 will be driven into mesh to be carried forward in that position for driving the numeral wheel in subtraction fashion. When the key is released, pivot arm 21 will be positioned relative to cam 25 so as to pivot segment 19 out of mesh with the numeral wheel pinion 20 for return to initial position. This return is accomplished automatically in the same manner as when adding is performed through the agency of spring 31 supported in the machine casing biasing the stop bar in the rear-most position.

Stop bar 10 is provided with an enlarged plate portion 120 having a slot 121 as shown in Fig. 4. Rod 122 is supported within the casing and extends transversely thereof positioned to be received in the slots 121. In the at rest position of the stop bar the forward rounded ends 123 of the slots 121 are engaged by rod 122. The forward movement of the stop bar is limited by the length of slot 121 as rear rounded end 124 is engaged by rod 122 and acts as a stop. Undulations 125 are provided on the underside of the rack along the length of plate portion 120 to function in cooperation with spring biased detent 126, as a means for defining the various forward positions of the rack and segmental gear corresponding to the digital values of the various keys. The frictional engagement of the spring biased detent 126 with the undulations in the plate 120 acts to both frictionally restrain longitudinal movement of the stop bar and thereby correct for backlash between the numeral wheel pinion 20 and to accurately locate the gear segment with respect to the numeral wheel pinion during operation of the machine.

The driving connection between the segmental gear 19 and rack 10 consists of a loose rivet 127. The gear segment, as hereinbefore described, tilts on supporting shaft 27 in and out of mesh with the numeral wheel pinion 20, play in the driving connection to accommodate the pivotal movement of the segment being provided by means of the loose driving connection.

Numeral wheel viewing aperture

As set out above in the General Description of the preferred embodiment of the present invention, a viewing aperture in a horizontally disposed window plate is positioned adjacent the periphery of each numeral wheel in the shaft carried wheel assembly. The window plate moves during rotational disposition of its associated positioning wheel from an initial forward location to a final back location, the viewing aperture being positioned above the numeral during the full extent of movement transmitted by the entocyclic gear mechanism.

As seen in Figs. 10 and 11, the horizontally disposed window plate 16 is pivotally supported on vertically disposed member 32 hung in the casing by means of pivot posts 33, 33'. Finger 35, having a tip portion 35' riding in groove 101 of numeral wheel 84, positions window plate 16 corresponding to the rotational position of the adjacent numeral wheel 85. It is observed that the position of window plate 16 is dependent upon the rotational position of the next lower order wheel 84 and not upon the rotational position of the corresponding denominational order numeral wheel 85 viewed therethrough.

As through the agency of the entocyclic gear mechanism, motion is transmitted to numeral wheel 85 from numeral wheel 84 in order to effect carrying, it is necessary to also provide some crawl compensation scheme. During one cycle of operation of a lower order wheel, the next higher order wheel moves through a distance of 18°, corresponding to the distance between adjacent numerals on the periphery of the wheel. During this same cycle of operation the window plate 16 and viewing aperture also move through a distance of 18°, from initial location to a final location, and return.

The cam groove 101 (Fig. 13) is gradually sloped from a portion of maximum depth 86 to raised portion 87 and, through the finger 35, adjusts window plate 16 from its forward location to its back location. Two similar grooves are provided in each numeral wheel, a step shoulder portion 105 being present between the deep portion and raised portion of adjacent grooves. The cam follower or finger 35 drops from the raised portion into the deep portion of the groove in order to return the window plate from its back location to the forward location.

Projecting arm 39 upon forward pivotal movement, such as occurs upon forward movement of the corresponding window plate, engages leg portion 38 of the associated window plate assembly and lifts the finger or cam follower 35 in a pivotal movement about horizontally disposed supports 36, 37. After the finger 35 rides up the gradually sloping surface of cam groove 101 to the raised portion 87, the movement of arm 39 lifting leg 38 drops finger 35 into the deep portion of groove 101 allowing return of the window plate to forward location. Spring 31 biases support element 32 in its forward position, the finger element 35 being available to cam the assembly so as to move the window plate into back location.

As shown in Fig. 2, each of the horizontally disposed window plates is positioned corresponding to the position of the next lower order wheel. Carrying or tens transfer is accomplished without associated means for relating in aligned position the different wheels of the shaft carried wheel assembly.

During subtraction, the entire window plate assembly is moved out of engagement with the shaft carried numeral wheel assembly. This is accomplished through vertically disposed and pivotally movable actuating cam lugs 42. Upon rotation of shaft 55 supporting the said cam lugs 42, engagement with arm portions 39 is effected which moves the entire viewing aperture assembly out of engagement with the shaft carried numeral wheels. Subtraction is then performed by registration of amounts on the keyboard.

After the subtraction operations have been performed, the viewing aperture assembly is moved back into contact with the numeral wheel assembly by oscillating shaft 55 to adding position, whereupon cam lugs 42 are removed from operating engagement with arm portions 39. The 'total' visible across the casing in the viewing apertures can then be read, as the window assembly upon return finds its proper position, as in all addition operations, dependent upon the cam groove positioning of finger 35.

*Numeral wheel clearing device*

In order to clear the machine and position each numeral wheel so as to align the wheels in the assembly, a clearing mechanism is provided driven through the agency of an actuating linkage. The clear rake 45 is shown in Fig. 27, and consists of a base portion 90 supported as shown in Fig. 15 on the shaft 46. Transversely disposed in the machine casing is a plate 91 fastened to rake 45 by studs 92, 93 and spring 94, 95. By oscillating handle 48, transverse plate 91 may be pivoted to bring rake 45 into engagement with cams 52, 53 carried on each numeral wheel to rotate the wheels in counterclockwise or adding direction in order to re-align in "0" position.

The rake 45 has two contacting end portions 50, 51, split so the forward lip 50 contacts lower cam shoulder 53 and the rear lip 51 contacts raised shoulder portion 52. The total rotational movement is divided, the foremost lip 50 first rotating the wheel during engagement with the cam shoulder 52 and the rear lip 51 picking up its corresponding cam shoulder 52 for completing rotation of the wheel to effect alignment.

During clearing operation, the window plate assembly may remain in engagement with the wheel assembly. Because the wheels are cleared by rotating in counterclockwise or adding direction, it is not necessary to dispose the assembly out of engagement with the numeral wheels as the finger cam follower will be in contact only in a conventional operating sequence and will not be encountering the shoulder portions of the cam groove in a negative fashion.

OPERATION

In the machine shown and described, a numeral wheel assembly is provided with gear mechanism of the entocyclic type to effect tens transfer between numeral wheels of a lower and a higher denominational order. Depression of one of the keys in a column corresponding to a numeral wheel of the same denominational order, by means of a driving mechanism, operates the wheel according to the digital value of the particular key depressed. Addition is accomplished simply by depressing the proper keys across the keyboard, the total being read in the apertures visible at the top of the casing.

As shown in Fig. 26, the crank rod (11) is maintained at an angle such that depression of the substantially horizontal portion will be given maximum travel for a given movement of an actuated key. The ends of the keys are normally in contact with the rod but are each held against downward movement by a spring 200. The normal position of each crank rod 11 is maintained by spring 31 which is anchored against shaft 122 and coiled about shaft 27. Pressure upon a key initiates depression of the rod 11 and the stop portion of the key arrives in the path of its stop 40 in time to check forward motion of the stop bar. The "9" keys need no stop on the bar as the end 124 of slot 121 acts as such stop after full forward movement of the stop bar and its connected rack segment 19.

Movement of depression of a key, during addition, causes movement of slotted member 21 rearwardly by causing rearward movement of pivot 25, which movement acting on cam 70 causes lateral, out of mesh, movement of the segment 19, before the segment is oscillated. This out of mesh movement continues, by virtue of impingement of a wing upon the arm 66. When the key is released the slot 26 returns to the central portion 71, allowing the segment 19 to return to mesh to rotate a numeral wheel a distance depending upon the key which was depressed.

Figure 3:
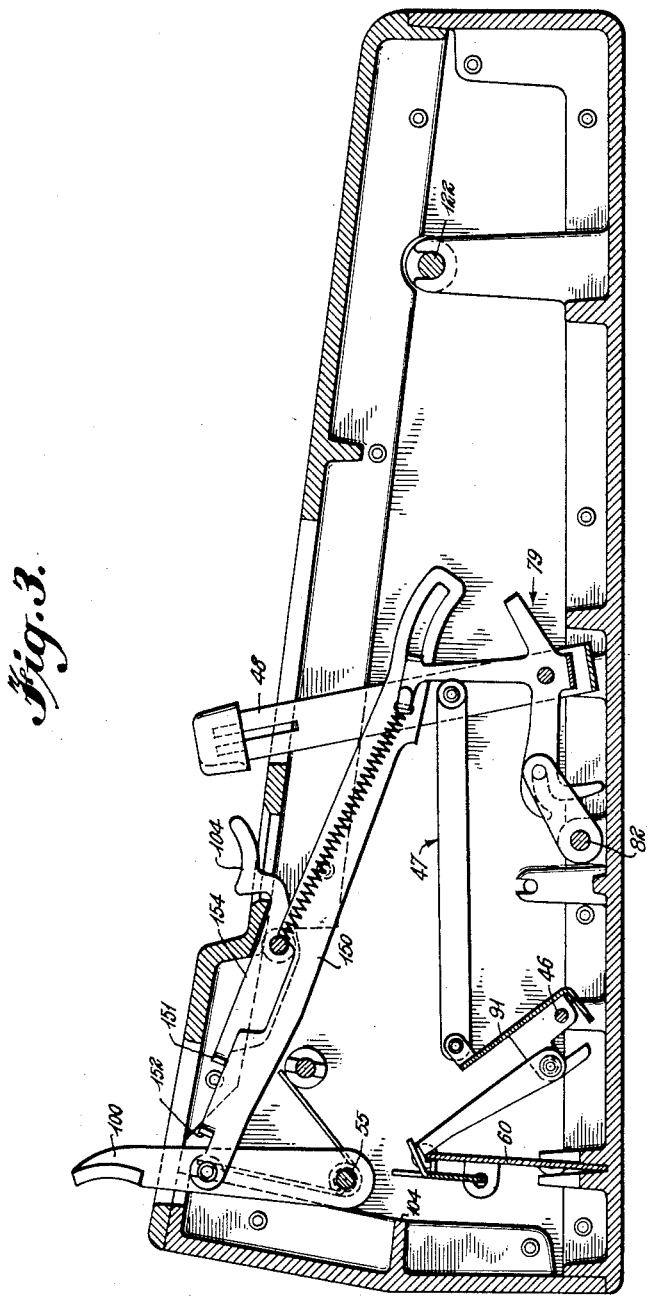
Fig. 3 is a view showing the clear rake operating scheme, subtract lever and release bar utilized in the present machine.

In subtraction, when the subtraction lever 100 is pulled rearwardly, as shown in Fig. 3, the wing 151 rides along the upper edge of link 150, to drop behind the stop 152, whereby the subtraction lever is retained until released by pressure on key 104. As explained above, actuation of the subtraction lever retracts the feeler fingers 35 from the cams 101 in the numeral wheels and reverses the pawls 108, 109.

The invention has been described by referring to the mechanism associated with one numeral wheel in the assembly, however, it is clear that a similar mechanism is provided for each numeral wheel in the assembly. The window viewing mechanism has been described as being positioned by a window plate carried follower and the cam mounted on the next lower order wheel, the "associated" numeral wheel in the assembly, the "corresponding" numeral wheel being that wheel adjacent which the plate is located.

Various modifications may be effected within the scope of the appended claims without departing from the spirit of the invention.

I claim:

1. In an adding machine the combination of a numeral wheel assembly for effecting tens transfer between numeral wheels of the assembly, said numeral wheels being mounted for rotation about a common axis, numeral wheel pinions, drive mechanisms for said numeral wheel pinions shiftable into and out of mesh with said pinions whereby direct subtraction may be accomplished on the machine, keys for operating said drive mechanisms, and means for effecting carrying between adjacent numeral wheels, said means comprising a window plate positioned above the higher order numeral wheel of said adjacent numeral wheels, cam means carried by the lower order numeral wheel of said adjacent numeral wheels, said cam means facing toward said higher order wheel, a follower engaging said cam means, means connecting said window plate to said follower to cause movement of said window plate upon movement of said follower when said lower order wheel is moved during addition, and means to move said follower out of contact with said cam means employed in addition when subtraction is being performed on said machine.

2. In an adding machine the combination of a numeral wheel assembly with gear mechanism of the entocyclic type for effecting tens transfer between wheels of a lower and a higher denominational order, said numeral wheels being mounted for rotation about a common axis; numeral wheel pinions, drive mechanisms for said numeral wheel pinions, and carrying means comprising window plates having viewing apertures, there being a window plate disposed above each numeral wheel, cam means carried on each lower order wheel associated with an adjacent higher order wheel, said cam means comprising recessed sloped surfaces facing said adjacent higher order wheel, and means to move the window plate disposed above said adjacent higher order wheel in response to movement of the cam means carried by said associated lower order wheel comprising a follower pivotally connected to said window plate, and a finger portion on said follower extending substantially parallel to the axis of rotation of said associated lower order numeral wheel and engaging the cam means carried by said associated lower order numeral wheel.

3. A crawl compensating mechanism for an adding machine having a numeral wheel assembly with means for effecting tens transfer between numeral wheels of the assembly, said numeral wheels being mounted for rotation about a common axis, said mechanism comprising a window plate having a viewing aperture, said window plate being disposed above a numeral wheel, means pivotally supporting said window plate for movement generally circumferentially with respect to said numeral wheel comprising an arm pivotally supporting said window plate for rotation about a first axis, means pivotally supporting said arm for rotation about a second axis spaced from said first axis a distance substantially the same as the distance between said numeral wheel and its associated adjacent lower order numeral wheel, and a follower extending from said last named means between adjacent faces of said numeral wheel and the lower order numeral wheel adjacent thereto.

References Cited in the file of this patent

UNITED STATES PATENTS

| | | |
|---|---|---|
| 670,075 | Heinitz | Mar. 19, 1901 |
| 838,128 | Mays | Dec. 11, 1906 |
| 1,127,061 | Mays | Feb. 2, 1915 |
| 1,142,079 | Cleal | June 8, 1915 |
| 1,725,978 | Dement | Aug. 27, 1929 |
| 1,781,320 | Crosman | Nov. 11, 1930 |
| 1,838,209 | Ball | Dec. 29, 1931 |
| 1,853,054 | Horton | Apr. 12, 1932 |
| 1,913,983 | Gardner | June 13, 1933 |
| 2,166,067 | Hossack | July 11, 1939 |
| 2,529,747 | Toorell | Nov. 14, 1950 |
| 2,558,631 | Suter | June 26, 1951 |